US012347580B2

(12) United States Patent
Chen et al.

(10) Patent No.: US 12,347,580 B2
(45) Date of Patent: Jul. 1, 2025

(54) NUCLEAR BATTERY INCLUDING FLEXIBLE NUCLEAR BATTERY MODULE

(71) Applicants: Po-Lin Chen, Taichung (TW); Chih-Tsung Kuo, Taichung (TW)

(72) Inventors: Po-Lin Chen, Taichung (TW); Chih-Tsung Kuo, Taichung (TW)

( * ) Notice: Subject to any disclaimer, the term of this patent is extended or adjusted under 35 U.S.C. 154(b) by 225 days.

(21) Appl. No.: 18/341,457

(22) Filed: Jun. 26, 2023

(65) Prior Publication Data

US 2024/0312661 A1 Sep. 19, 2024

(30) Foreign Application Priority Data

Mar. 17, 2023 (TW) ................................ 112109965

(51) Int. Cl.
*G21H 1/06* (2006.01)
*G21G 4/04* (2006.01)

(52) U.S. Cl.
CPC ................. *G21H 1/06* (2013.01); *G21G 4/04* (2013.01)

(58) Field of Classification Search
CPC .. G21H 1/02; G21H 1/06; G21H 1/00; G21G 4/06; G21G 4/00
USPC ....... 310/303; 257/428; 250/519.1; 136/258; 429/5
See application file for complete search history.

(56) References Cited

U.S. PATENT DOCUMENTS 3,344,289 A * 9/1967 Knight ..................... G21H 1/02 976/DIG. 411
3,706,893 A * 12/1972 Olsen ..................... G21H 1/06 976/DIG. 413
3,836,798 A * 9/1974 Greatbatch ............ A61N 1/378 976/DIG. 413
5,606,213 A * 2/1997 Kherani .................. G21H 1/06 136/258
5,721,462 A * 2/1998 Shanks .................... G21H 1/04 136/258
6,118,204 A * 9/2000 Brown ..................... G21H 1/06 136/202
8,653,715 B1 * 2/2014 Baumbaugh ............. G21H 1/04 310/305
8,866,152 B2 * 10/2014 Lal ......................... G21H 1/06 257/77
9,391,218 B2 * 7/2016 Gaspari .................. G21H 1/06
9,530,529 B2 * 12/2016 Choi ....................... G21H 1/06

* cited by examiner

*Primary Examiner* — Burton S Mullins
(74) *Attorney, Agent, or Firm* — MUNCY, GEISSLER, OLDS & LOWE, P.C.

(57) ABSTRACT

A nuclear battery module is adapted for a nuclear battery. The nuclear battery module includes a radioactive unit and at least one energy conversion unit. The radioactive unit includes a soft substrate and at least one radioactive layer disposed on the soft substrate. The at least one radioactive layer includes a β-ray source. The at least one energy conversion unit includes a flexible carrier layer, an N-type semiconductor layer disposed on the flexible carrier layer, and a P-type semiconductor layer disposed on the N-type semiconductor layer opposite to the flexible carrier layer. The at least one energy conversion unit is disposed on the radioactive unit in a manner such that the flexible carrier layer is proximate to the radioactive unit.

17 Claims, 8 Drawing Sheets

NUCLEAR BATTERY INCLUDING FLEXIBLE NUCLEAR BATTERY MODULE

CROSS-REFERENCE TO RELATED APPLICATION

This application claims priority to Taiwanese Invention patent Application No. 112109965, filed on Mar. 17, 2023.

FIELD

The disclosure relates to a nuclear battery, and more particularly to a nuclear battery including a flexible nuclear battery module.

BACKGROUND

A nuclear battery is a device which uses radiation energy produced from the decay of a radioactive material to excite a semiconductor component so as to convert the radiation energy into electricity to provide energy. The nuclear battery generally includes a shell, a radioactive unit disposed within the shell, and a semiconductor stack disposed within the shell and proximate to the radioactive unit so as to receive the radiation energy from the radioactive unit and to convert the radiation energy into the electricity. The radioactive unit includes a radioactive material and a non-radioactive layer disposed between the radioactive material and the semiconductor stack so as to isolate the radioactive material from the semiconductor stack, such that the damage of the semiconductor stack due to receiving excessive radiation energy from the radioactive material can be delayed. The non-radioactive layer is generally made of a dielectric material (for example, glass).

In a conventional nuclear battery, the radioactive material used as a radiation source is generally in a form of a crystalline block and is isolated from the semiconductor stack by the non-radioactive layer. Therefore, the radioactive material is not conductive to the development of lightweight and miniaturization of the nuclear battery, and is not flexible for the structural design of the nuclear battery. In addition, due to volume limitation of the radioactive material in the form of the crystalline block, a radiative material with a higher radiation intensity is mainly used as the radiation source to release more radiation particles to excite the semiconductor stack, so as to enhance an energy conversion efficiency of the nuclear battery in a limited configuration space of the shell. Therefore, there are safety concerns of the radiation energy emitted from the radiative material being liable to leakage due to the excessively high intensity thereof. In addition, a service life of the nuclear battery may be shortened due to the damage of the semiconductor stack caused by too much radiation energy irradiated on the semiconductor stack.

SUMMARY

Therefore, an object of the disclosure is to provide a nuclear battery that can alleviate at least one of the drawbacks of the prior art.

According to an aspect of the disclosure, a nuclear battery module is adapted for a nuclear battery. The nuclear battery module includes a radioactive unit and at least one energy conversion unit. The radioactive unit includes a soft substrate and at least one radioactive layer disposed on the soft substrate. The at least one radioactive layer includes a β-ray source. The at least one energy conversion unit includes a flexible carrier layer, an N-type semiconductor layer disposed on the flexible carrier layer, and a P-type semiconductor layer disposed on the N-type semiconductor layer opposite to the flexible carrier layer. The at least one energy conversion unit is disposed on the radioactive unit in a manner such that the flexible carrier layer is proximate to the radioactive unit.

According to another aspect of the disclosure, a nuclear battery includes a shell and a nuclear battery module. The shell defines a receiving space. The nuclear battery module is rolled up or bent so as to be disposed within the receiving space. The nuclear battery module includes a radioactive unit and at least one energy conversion unit. The radioactive unit includes a soft substrate and at least one radioactive layer disposed on the soft substrate. The at least one radioactive layer includes a β-ray source. The at least one energy conversion unit includes a flexible carrier layer, an N-type semiconductor layer disposed on the flexible carrier layer, and a P-type semiconductor layer disposed on the N-type semiconductor layer opposite to the flexible carrier layer. The at least one energy conversion unit is disposed on the radioactive unit in a manner such that the flexible carrier layer is proximate to the radioactive unit.

BRIEF DESCRIPTION OF THE DRAWINGS

Other features and advantages of the disclosure will become apparent in the following detailed description of the embodiment(s) with reference to the accompanying drawings. It is noted that various features may not be drawn to scale.

DETAILED DESCRIPTION

Figure 1:
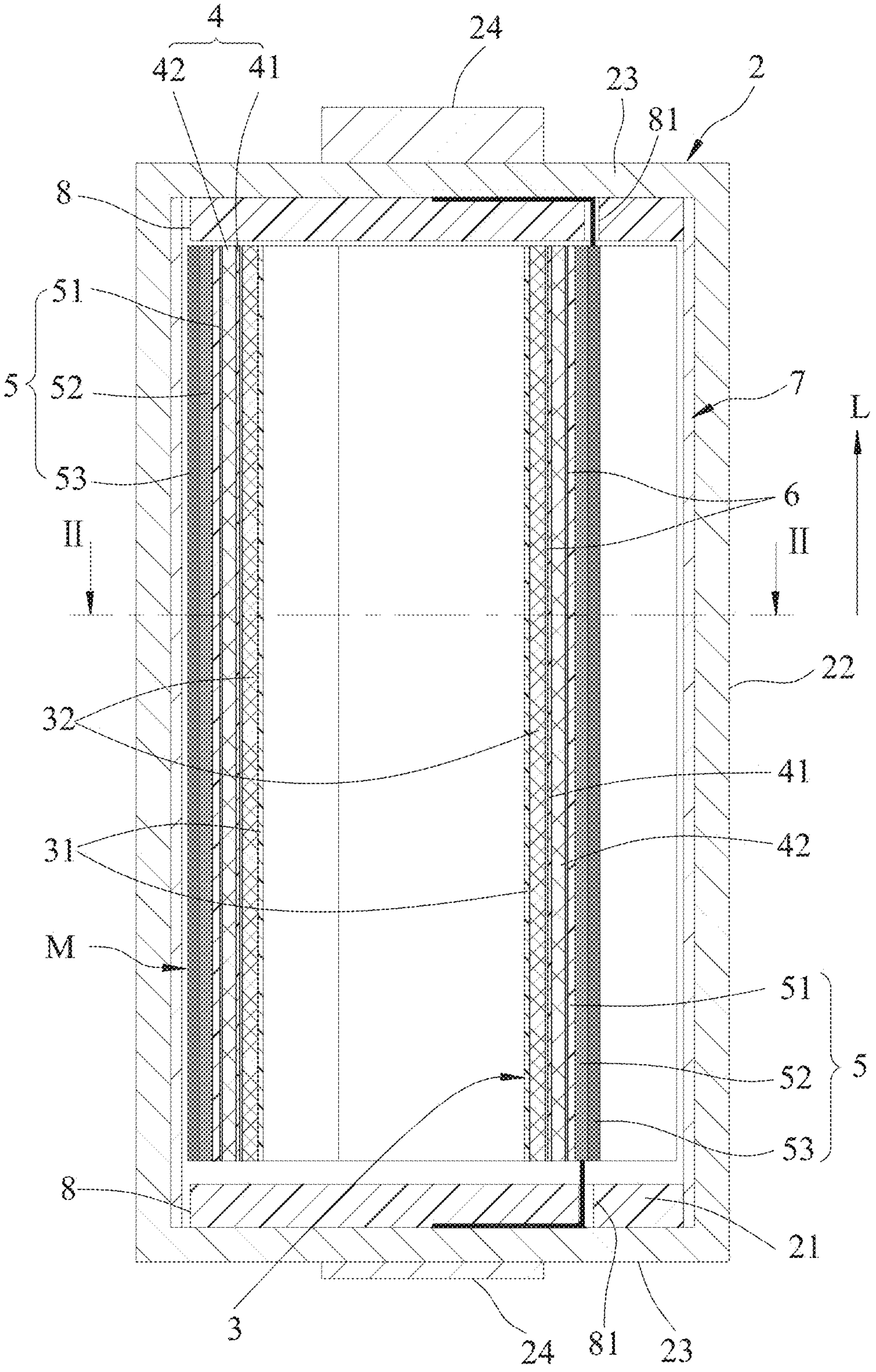
FIG. 1 is a schematic sectional view illustrating a first embodiment of a nuclear battery according to the disclosure.

Before the disclosure is described in greater detail, it should be noted that where considered appropriate, reference numerals or terminal portions of reference numerals have been repeated among the figures to indicate corresponding or analogous elements, which may optionally have similar characteristics.

Figure 2:
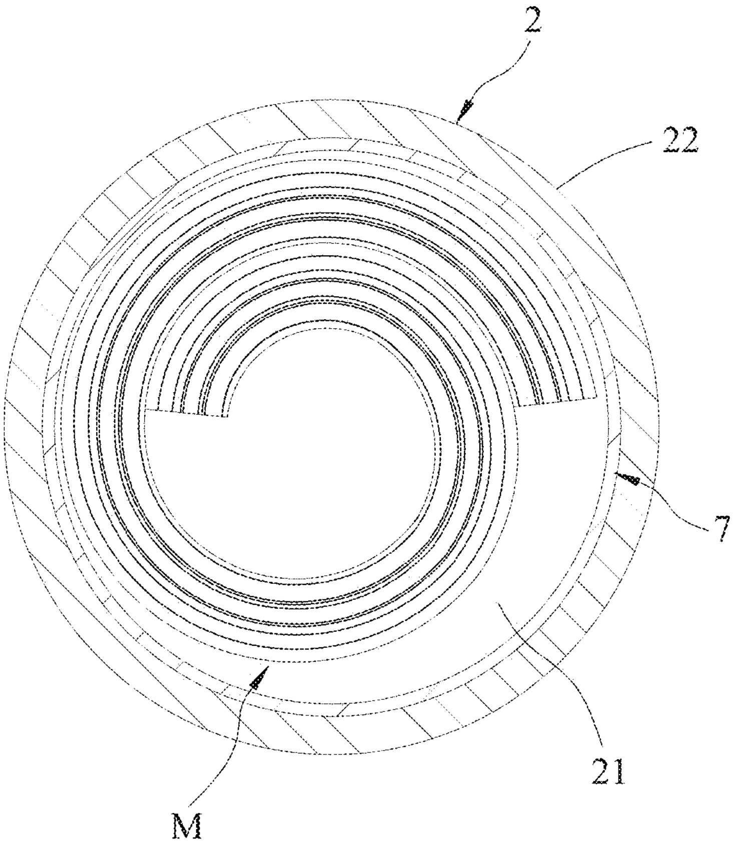
FIG. 2 is a partial sectional view taken along line II-II of FIG. 1.
Figure 3:
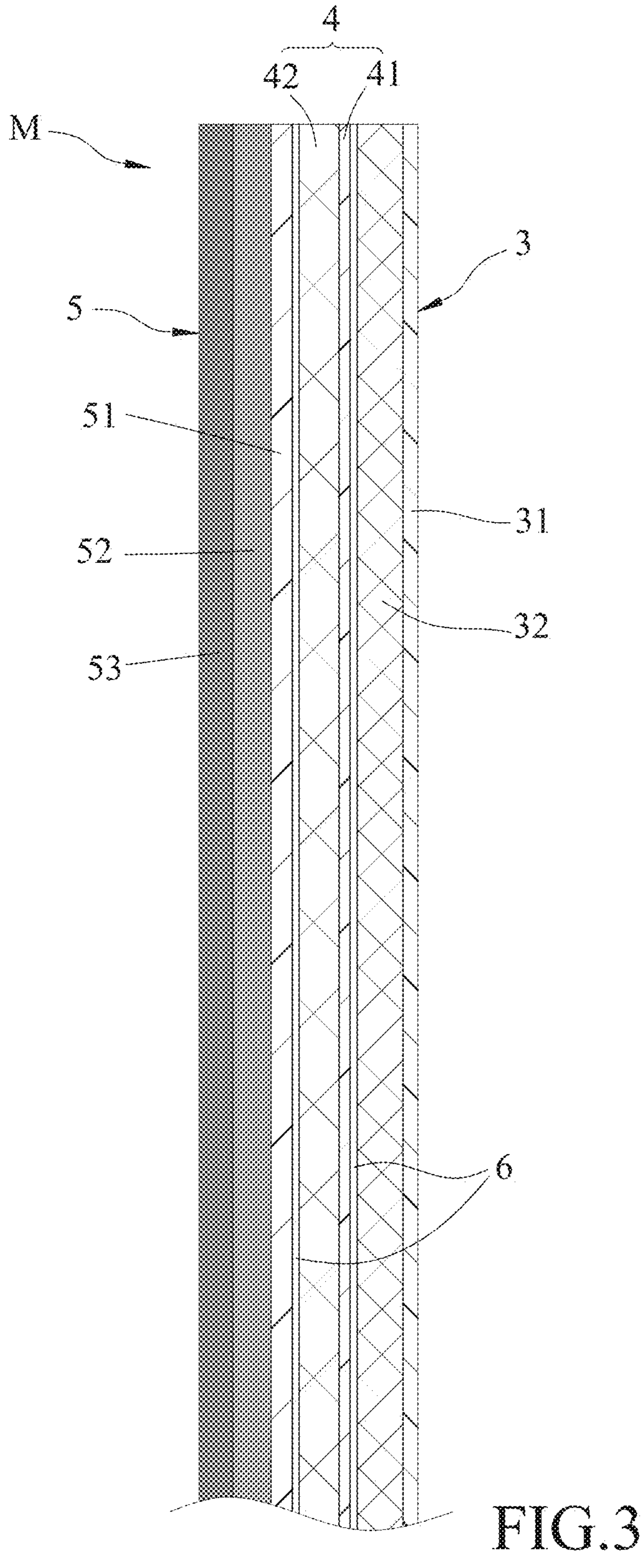
FIG. 3 is a fragmentary sectional view of the first embodiment shown in FIG. 1.

Referring to FIGS. 1, 2 and 3, a first embodiment of a nuclear battery according to the disclosure is configured as an optoelectric nuclear battery, and includes a shell 2, a radioactive unit 3, a wavelength conversion unit 4, an energy conversion unit 5, and a radiation shielding layer 7. The radioactive unit 3, the wavelength conversion unit 4, and the energy conversion unit 5 are stacked together so as to be configured as a nuclear battery module (M).

The shell 2 defines a receiving space 21 to provide a protection effect for components received in the receiving space 21, and may be made of a metal material (for example, but not limited to, aluminum, lead, or the like, or combinations thereof), a radiation-resistant plastic material (for example, but not limited to, an aluminum-plated plastic material, or the like), a plastic material doped with radiation-resistant particles (for example, but not limited to, lead oxide particles, bismuth oxide particles, or the like, or combinations thereof), or combinations thereof. In the first embodiment, the shell 2 is configured as a cylindrical shape, and includes a surrounding wall portion 22 extending in a lengthwise direction (L), two end portions 23 respectively disposed at two opposite ends of the surrounding wall portion 22 in the lengthwise direction (L), and two electric connecting elements 24 respectively disposed on the two end portions 23. The electric connecting elements 24 are used for external electrical connection. The receiving space 21 is defined by the surrounding wall portion 22 and the two end portions 23 together.

Figure 4:
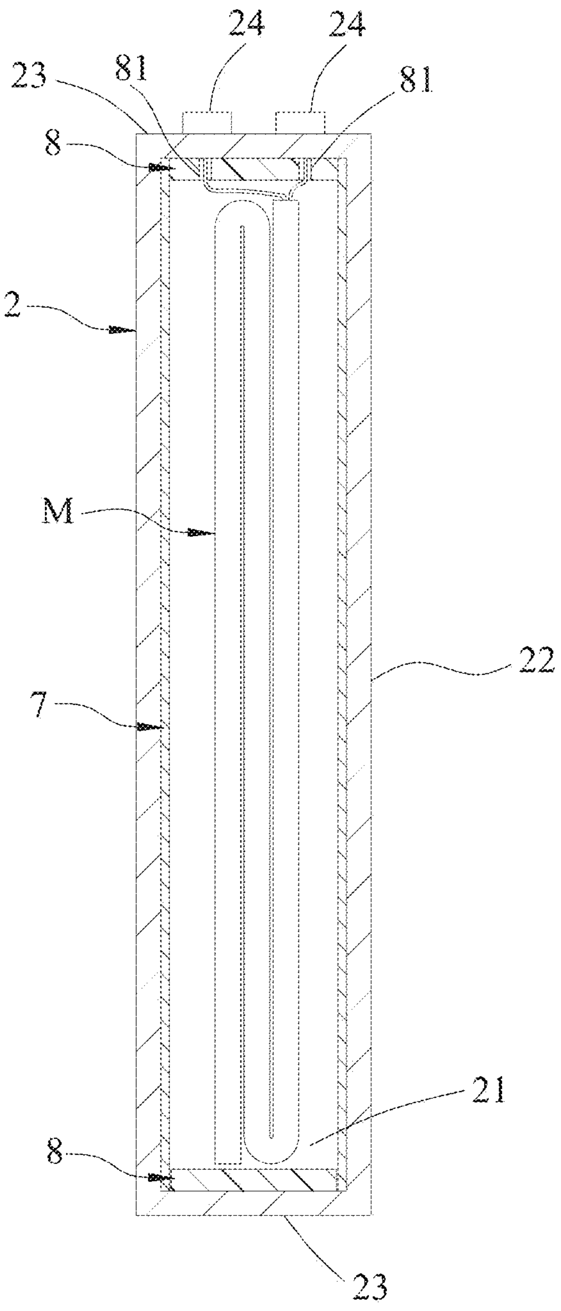
FIG. 4 is a schematic partial sectional view illustrating a second embodiment of a nuclear battery according to the disclosure.
Figure 5:
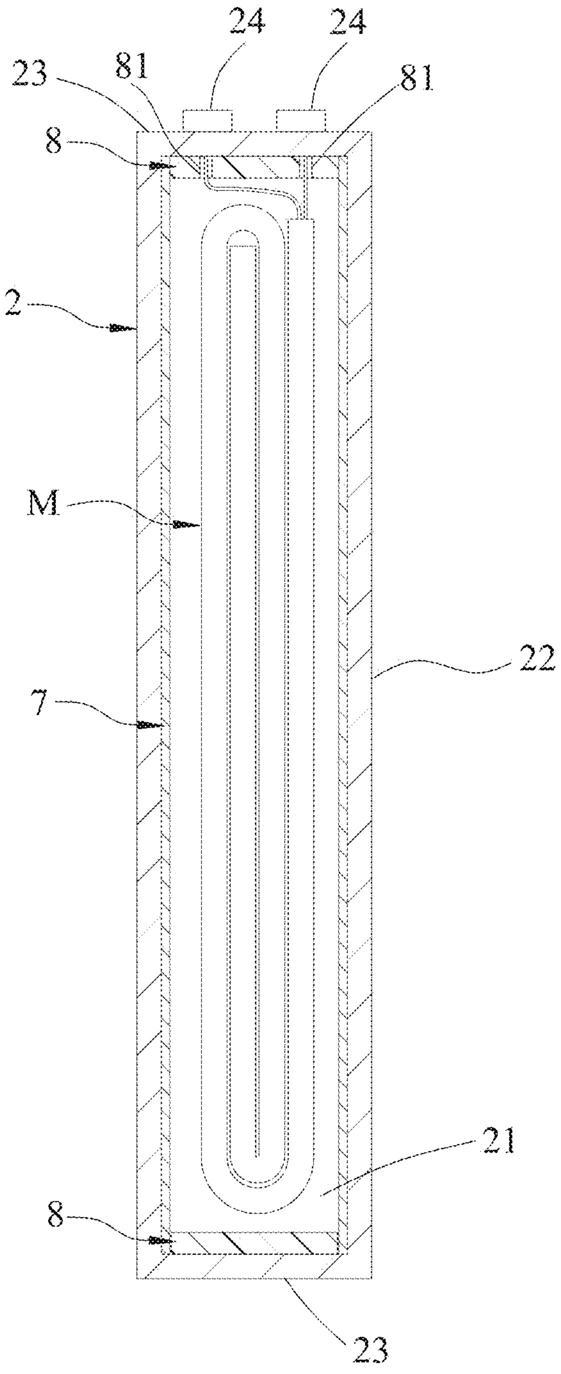
FIG. 5 is a schematic partial sectional view illustrating a third embodiment of a nuclear battery according to the disclosure.

It should be noted that a structural configuration of the shell 2 may be varied according to the product requirements, and thus is not limited to the configuration described above. For example, the shell 2 may be configured as a prismatic form, a pouch form, or the like. In addition, the position and the number of the electric connecting elements 24 may be varied according to the product requirements. For example, two or more of the electric connecting elements 24 may be provided on one of the two end portions 23, as illustrated in FIGS. 4 and 5. Alternatively, the shell 2 may be provided with a single electric connecting element 24 disposed on one of the two end portions 23.

The radiation shielding layer 7 is disposed on an inner surface of the surrounding wall portion 22 so as to further prevent leakage of the radiation energy produced from the radioactive unit 3. The radiation shielding layer 7 may be made of a metal material (for example, but not limited to, aluminum, lead, or the like, or combinations thereof).

It should be noted that the radiation shielding layer 7 may be omitted if the shell 2 is capable of preventing the leakage of the radiation energy.

The radioactive unit 3 includes a soft substrate 31, and a radioactive layer 32 disposed on a surface of the soft substrate 31 and including a β-ray source. The radioactive layer 32 is formed by depositing a natural radioactive source or an isotopic material on the surface of the soft substrate 31 using a suitable deposition process (such as a physical vapor deposition process, for example, but not limited to, sputtering, evaporation, vapor deposition, ion plating, or the like). Therefore, the radioactive unit 3 thus formed has good flexibility.

The soft substrate 31 may be made of a material that does not block β-ray, for example, graphene, polyethylene terephthalate (PET), or the like, or combinations thereof, and has a thickness ranging from about 0.06 mm to 0.10 mm. The radioactive layer 32 may be made of a radiative material, for example, but not limited to, carbon-14 (C-14), nickel-63 (Ni-63), other radioactive isotope that can undergo β-radioactive decay, or combinations thereof, and has a thickness ranging from about 0.003 mm to about 0.010 mm.

It should be noted that the radioactive layer 32 may be formed by any suitable deposition processes, which depend on the choice of the materials of the soft substrate 31 and the radioactive layer 32, as long as the radioactive layer 32 formed on the soft substrate 31 is flexible. Therefore, the deposition process for forming the radioactive layer 32 is not limited to the examples described above. In addition, the operation parameters for the deposition process are known to those skilled in the art, and thus are not described in details herein.

The wavelength conversion unit 4 is disposed between the radioactive unit 3 and the energy conversion unit 5, and includes a soft layer 41 and a wavelength conversion layer 42 disposed on the soft layer 41. The wavelength conversion unit 4 is stacked on the radioactive unit 3 in a manner such that the soft layer 41 of the wavelength conversion unit 4 is proximate to the radioactive layer 32 of the radioactive unit 3. The wavelength conversion unit 4 is flexible. The wavelength conversion layer 42 is made of a light-emitting material, for example, but not limited to, scintillator, phosphor, or the like, or combinations thereof. The wavelength conversion layer 42 is used for receiving β-ray emitted from the radioactive layer 32 of the radioactive unit 3, so as to produce excitation light having a wavelength different from that of β-ray after being struck by the radiation particles of the β-ray.

In the first embodiment, the soft layer 41 may be made of a material which is similar to or the same as that of the soft substrate 31, and may have a thickness ranging from about 0.06 mm to about 0.10 mm. The wavelength conversion layer 42 may include organic scintillator or inorganic scintillator. Examples of the inorganic scintillator include, for example, but not limited to, cadmium tungstate ($CdWO_4$), bismuth germanate ($Bi_4(GeO_4)_3$, BGO), cerium-doped lutetium yttrium oxyorthosilicate (LYSO:Ce), cerium-doped gadolinium aluminum gallium garnet (GAGG:Ce), alkali halide crystals (for example, but not limited, sodium iodide crystal, cerium iodide crystal, or the like, or combinations thereof), and the like, and combinations thereof. The wavelength conversion layer 42 may be formed by depositing or coating the scintillator on the soft layer 41. The wavelength conversion layer 42 may have a thickness ranging from about 0.003 mm to about 0.010 mm.

The energy conversion unit 5 is used to receive the excitation light from the wavelength conversion layer 42, and converts the excitation light into electricity. The energy conversion unit 5 includes a flexible carrier layer 51, an N-type semiconductor layer 52 disposed on the flexible carrier layer 51, and a P-type semiconductor layer 53 disposed on the N-type semiconductor layer 52 opposite to the flexible carrier layer 51. The energy conversion unit 5 is stacked on the wavelength conversion unit 4 in a manner such that the flexible carrier layer 51 is proximate to the radioactive unit 3. In the first embodiment, the flexible carrier layer 51 may be made of a material which is similar to or the same as that of the soft substrate 31, and may have a thickness ranging from about 0.06 mm to about 0.10 mm. The N-type semiconductor layer 52 may be formed on the flexible carrier layer 51 by a suitable deposition process known to those skilled in the art. The N-type semiconductor layer 52 may be made of a suitable semiconductor material (for example, but not limited to, monocrystalline silicon, polycrystalline silicon, silicon carbide, gallium nitride, gallium arsenide, other Group-IV semiconductor materials, or combinations thereof) doped with a suitable N-type dopant. The P-type semiconductor layer 53 may be formed on the N-type semiconductor layer 52 opposite to the flexible carrier layer 51 by a suitable deposition process known to those skilled in the art. The P-type semiconductor layer 53 may be made of a suitable semiconductor material (for example, but not limited to, monocrystalline silicon, polycrystalline silicon, silicon carbide, gallium nitride, gallium arsenide, other Group-IV semiconductor materials, or combinations thereof) doped with a suitable P-type dopant.

The first embodiment of the nuclear battery according to the disclosure further includes two isolation layers 8 disposed within the receiving space 21. Each of the isolation layers 8 is disposed proximate to a corresponding one of the end portions 23 so as to prevent a corresponding one of two end surfaces of the nuclear battery module (M) transverse to the lengthwise direction (L) from direct contact with shell 2. Each of the isolation layers 8 is formed with a perforation 81 extending into a corresponding one of the isolation layers 8 in the lengthwise direction (L). In some embodiments, as shown in FIGS. 4 and 5, the perforation 81 may be merely formed in one of the isolation layers 8. The N-type semiconductor layer 52 is formed with a conductive wiring pattern (not shown) on a surface thereof proximate to the radioactive layer 32 of the radioactive unit 3. The P-type semiconductor layer 53 is formed with a conductive wiring pattern (not shown) on a surface thereof which is distal from the N-type semiconductor layer 52. Each of the N-type semiconductor layer 52 and the P-type semiconductor layer 53 is electrically connected to a corresponding one of the two electric connecting elements 24 through the conductive wiring pattern formed thereon and a conductive wire that passes through the perforation 81 to interconnect the conductive wiring pattern and the corresponding one of the two electric connecting elements 24, so as to permit the energy conversion unit 5 to be electrically connected extern ally.

It should be noted that the thicknesses and the materials of the radioactive unit 3, the wavelength conversion unit 4, and the energy conversion unit 5 may be varied according to the practical design requirements thereof, and are not limited to those described above. In addition, the first embodiment of the nuclear battery according to the disclosure may further include the components (for example, but not limited to, a current interrupt device (CID), a gasket, or the like) which are known to those skilled in the art and thus are not described in details herein.

In the first embodiment of the nuclear battery according to the disclosure, the nuclear battery module (M) further includes a plurality of adhesive layers 6, which are used to adhere the radioactive unit 3, the wavelength conversion unit 4, and the energy conversion unit 5 together so as to form the nuclear battery module (M) as shown in FIG. 5. Each of the adhesive layers 6 may be independently selected from, for example, but not limited to, an acrylic-based adhesive, a PET-based adhesive, or the like, or combinations thereof. The nuclear battery module (M) is flexible, and may be rolled up to be disposed within the receiving space, as shown in FIG. 2. Therefore, the nuclear battery module (M) is conductive to the lightweight of the nuclear battery.

Since the nuclear battery module (M) may be easily bent or rolled up, the structural design of the nuclear battery according to the disclosure is more flexible. In addition to the rolled-up configuration shown in FIG. 2, the nuclear battery module (M) may be disposed in the shell 2 in any suitable alternative configurations (for example, a folded configuration, an inclusive configuration, or the like).

FIG. 4 illustrates a second embodiment of the nuclear battery according to the disclosure. In the second embodiment, the shell 2 is configured in a rectangular column shape, the two electric connecting elements 24 are disposed on one of the two end portions 23 of the shell 2, the nuclear battery module (M) received in the shell 2 is configured in an S-shaped bent form, and the two end surfaces of the nuclear battery module (M) transverse to the lengthwise direction (L) respectively face toward the two end portions 23 of the shell 2. In order to simplify the illustration of the second embodiment, detailed structures of the nuclear battery module (M) are not shown in FIG. 4. One of the isolation layers 8 is formed with two of the perforations 81. The conductive wiring patterns (not shown in FIG. 4) formed on the nuclear battery module (M) are electrically connected to the two electric connecting elements 24, respectively, through two of the conductive wirings that respectively pass through the perforations 81 to respectively interconnect the conductive wiring patterns and the two electric connecting elements 24.

Referring to FIG. 5, a third embodiment of the nuclear battery according to the disclosure is similar to the second embodiment shown in FIG. 4 except that the nuclear battery module (M) received in the shell 2 is configured in an inclusive form.

As described above, in the conventional nuclear battery, the radioactive material used as the radiation source is generally in the form of the crystalline block, which is not conductive to the development of miniaturization of the nuclear battery. In addition, due to the volume limitation of the radioactive material in the form of the crystalline block, the radiative material with a higher radiation intensity is used as the radiation source to release more radiation particles to excite the semiconductor stack, so as to enhance the energy conversion efficiency of the nuclear battery in a limited configuration space of the shell. Therefore, there are safety concerns of the radiation energy emitted from the radiative material being liable to leakage due to the excessively high intensity thereof. In the nuclear battery according to the disclosure, the radioactive unit 3, the wavelength conversion unit 4, and the energy conversion unit 5 are all flexible. Therefore, the nuclear battery module (M) thus formed is flexible and may be rolled up or bent to be disposed in the receiving space 21 of the shell 2. Therefore, the energy conversion efficiency and the service life of the nuclear battery according to the disclosure can be enhanced by increasing a radiation area of the radioactive layer 32 of the radioactive unit 3. The aforesaid safety concerns of the radiation energy emitted from the radiative material being liable to leakage due to the excessively high intensity thereof may be avoided.

It should be noted that the numbers of the radioactive layer 32, the wavelength conversion unit 4, and the energy conversion unit 5 may be chosen according to the practical requirements, and thus are not limited to those described above.

Figure 6:
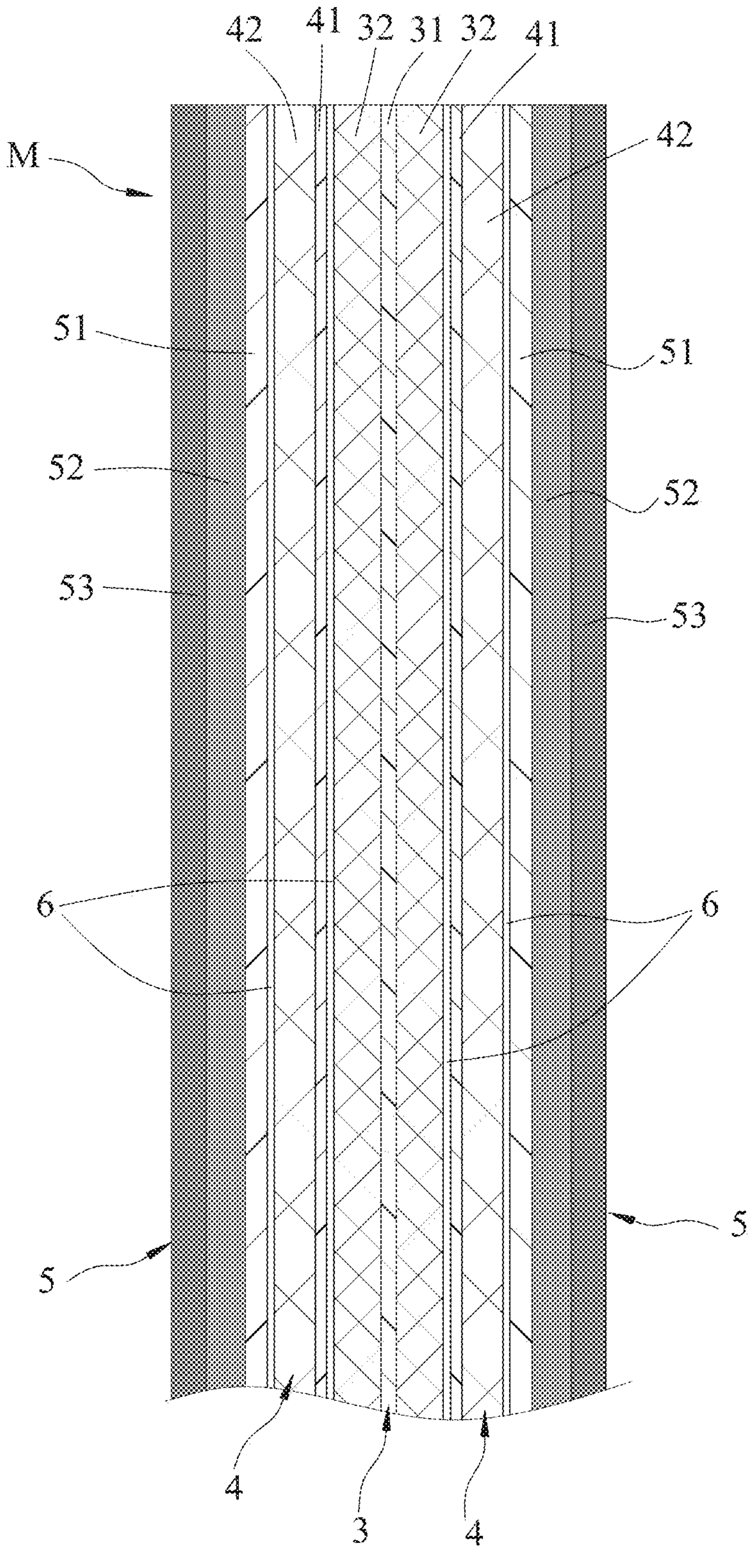
FIG. 6 is a fragmentary sectional view illustrating a fourth embodiment of a nuclear battery according to the disclosure.

FIG. 6 illustrates a fourth embodiment of the nuclear battery according to the disclosure. In the fourth embodiment, the nuclear battery module (M) includes one of the radioactive unit 3, two of the wavelength conversion units 4, and two of the energy conversion units 5. The radioactive unit 3 includes two of the radioactive layers 32 respectively disposed on two opposite surfaces of the soft substrate 31. Each of the wavelength conversion units 4 is disposed on a corresponding one of the radioactive layers 32 opposite to the soft substrate 31. Each of the energy conversion units 5 is disposed on a corresponding one of the wavelength conversion units 4 opposite to the radioactive unit 3.

Figure 7:
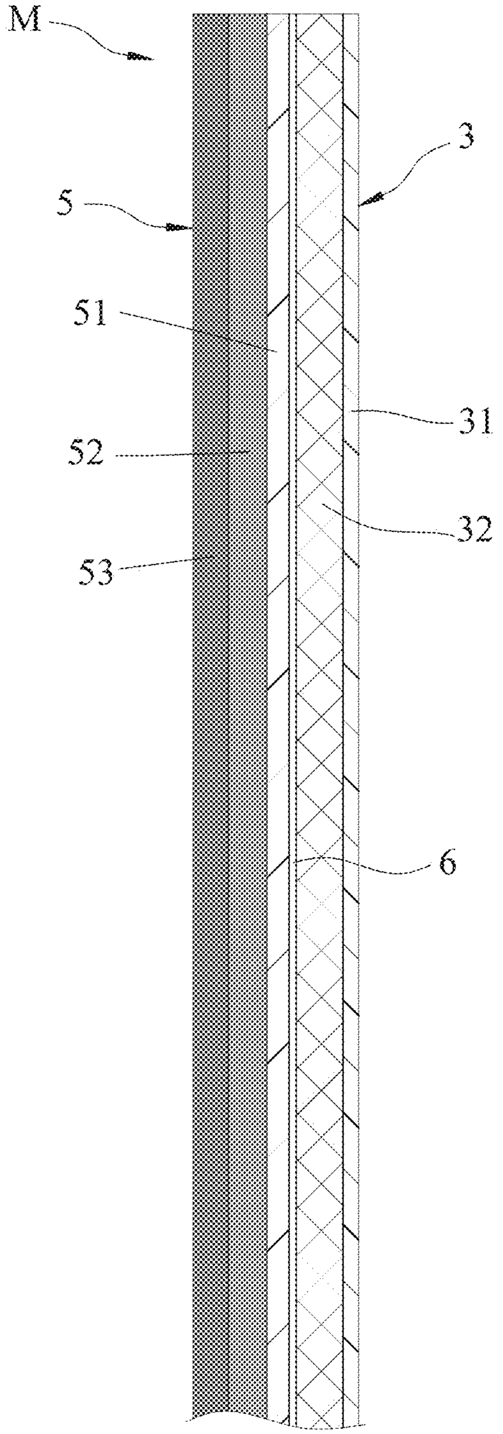
FIG. 7 is a fragmentary sectional view illustrating a fifth embodiment of a nuclear battery according to the disclosure.

FIG. 7 illustrates a fifth embodiment of the nuclear battery according to the disclosure, which is configured as a betavoltaic cell. In the fifth embodiment, the wavelength conversion units 4 described above are not included. That is, the fifth embodiment of the nuclear battery according to the disclosure merely includes the radioactive unit 3 and the energy conversion unit 5 stacked to each other. The energy conversion unit 5 directly receives the β-ray emitted from the radioactive layer 32 of the radioactive unit 3, such that the N-type semiconductor layer 52 and the P-type semiconductor layer 53 of the energy conversion unit 5 respectively produce a plurality of electrons and a plurality of holes, so as to generate electricity through migration of the electrons and the holes.

Figure 8:
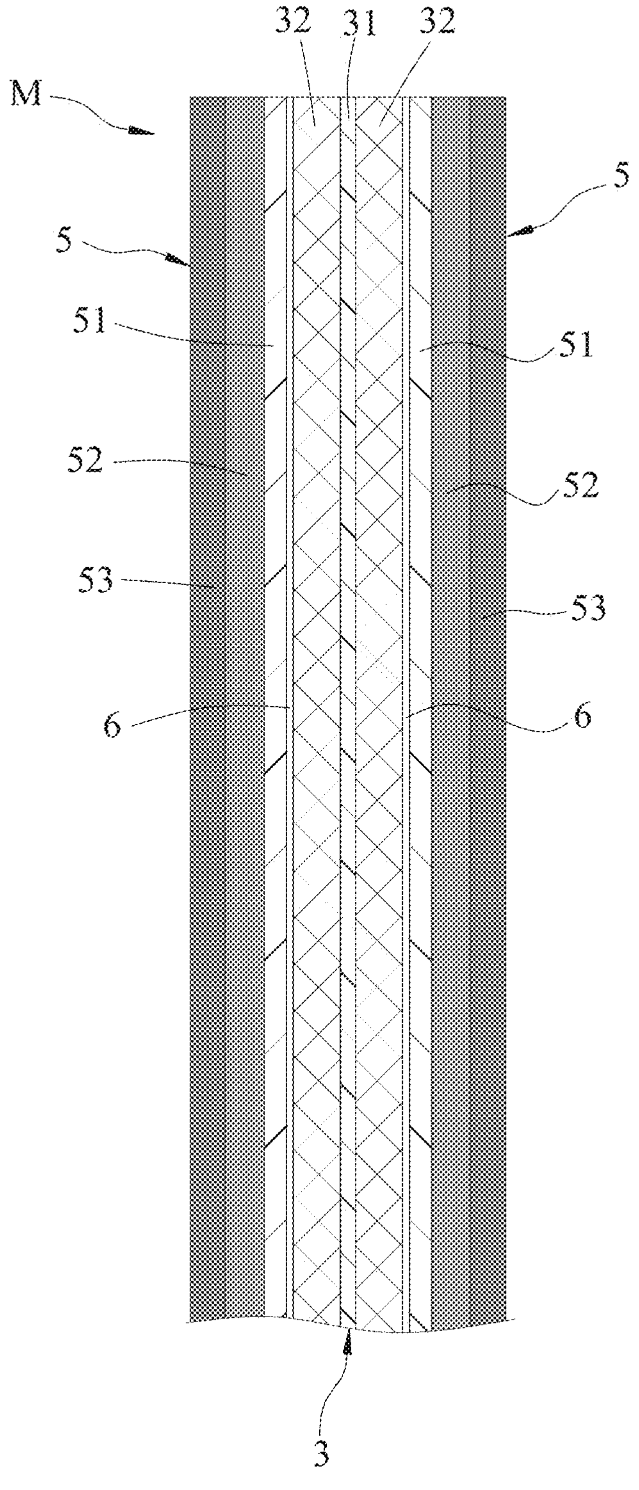
FIG. 8 is a fragmentary sectional view illustrating a sixth embodiment of a nuclear battery according to the disclosure.

FIG. 8 illustrates a sixth embodiment of the nuclear battery according to the disclosure, which is also configured as the betavoltaic cell. In the sixth embodiment, the wavelength conversion units 4 described above are not included. The sixth embodiment of the nuclear battery according to the disclosure includes two of energy conversion units 5 respectively disposed on two opposite surfaces of the radioactive unit 3. The radioactive unit 3 includes two of the radioactive layers 32 respectively disposed on two opposite surfaces of the soft substrate 31. Each of the energy conversion units 5 is disposed on a corresponding one of the radioactive layers 32 opposite to the soft substrate 31.

In summary, in the nuclear battery according to the disclosure, the radioactive layer 32 is formed by depositing the natural radioactive source or the isotopic material on the soft substrate 31 using a suitable deposition process, such that the radioactive unit 3 thus formed has good flexibility and can be rolled up or bent easily. In addition, the nuclear battery module (M), which is formed by stacking the radioactive unit 3, the wavelength conversion unit 4, and the energy conversion unit 5 together, is flexible and thus may be rolled up or bent to be disposed within the receiving space 21 of the shell 2. Therefore, the nuclear battery module (M) is conductive to the lightweight of the nuclear battery. Furthermore, the energy conversion efficiency and the service life of the nuclear battery according to the disclosure can be enhanced by increasing the radiation area of the radioactive layer 32 of the radioactive unit 3. Therefore, the aforesaid safety concerns of the radiation energy emitted from the radiative material being liable to leakage due to the excessively high intensity thereof may be avoided.

In the description above, for the purposes of explanation, numerous specific details have been set forth in order to provide a thorough understanding of the embodiment(s). It will be apparent, however, to one skilled in the art, that one or more other embodiments may be practiced without some of these specific details. It should also be appreciated that reference throughout this specification to "one embodiment," "an embodiment," an embodiment with an indication of an ordinal number and so forth means that a particular feature, structure, or characteristic may be included in the practice of the disclosure. It should be further appreciated that in the description, various features are sometimes grouped together in a single embodiment, figure, or description thereof for the purpose of streamlining the disclosure and aiding in the understanding of various inventive aspects; such does not mean that every one of these features needs to be practiced with the presence of all the other features. In other words, in any described embodiment, when implementation of one or more features or specific details does not affect implementation of another one or more features or specific details, said one or more features may be singled out and practiced alone without said another one or more features or specific details. It should be further noted that one or more features or specific details from one embodiment may be practiced together with one or more features or specific details from another embodiment, where appropriate, in the practice of the disclosure.

While the disclosure has been described in connection with what is (are) considered the exemplary embodiment(s), it is understood that this disclosure is not limited to the disclosed embodiment(s) but is intended to cover various arrangements included within the spirit and scope of the broadest interpretation so as to encompass all such modifications and equivalent arrangements.

What is claimed is:

1. A nuclear battery module adapted for a nuclear battery, comprising:

a radioactive unit including a soft substrate and at least one radioactive layer disposed on said soft substrate, said at least one radioactive layer including a β-ray source; and at least one energy conversion unit including a flexible carrier layer, an N-type semiconductor layer disposed on said flexible carrier layer, and a P-type semiconductor layer disposed on said N-type semiconductor layer opposite to said flexible carrier layer, said at least one energy conversion unit being disposed on said radioactive unit in a manner such that said flexible carrier layer is proximate to said radioactive unit.

2. The nuclear battery module as claimed in claim 1, further comprising at least one wavelength conversion unit disposed between said radioactive unit and said at least one energy conversion unit, said at least one wavelength conversion unit including a soft layer and a wavelength conversion layer disposed on said soft layer, said wavelength conversion layer including a light-emitting material selected from scintillator, phosphor, or a combination thereof, and receiving β-ray emitted from said radioactive layer so as to produce excitation light having a wavelength different from that of the β-ray.

3. The nuclear battery module as claimed in claim 1, wherein said radioactive unit includes two of said radioactive layers respectively disposed on two opposite surfaces of said soft substrate, said nuclear battery module including two of said energy conversion units, each of which is disposed on a corresponding one of said radioactive layers opposite to said soft substrate.

4. The nuclear battery module as claimed in claim 1, further comprising at least one adhesive layer used to adhere said radioactive unit and said at least one energy conversion unit together.

5. The nuclear battery module as claimed in claim 2, further comprising at least one adhesive layer used to adhere said radioactive unit, said at least one wavelength conversion unit, and said at least one energy conversion unit together.

6. The nuclear battery module as claimed in claim 1, wherein said soft substrate is made of a material selected from graphene, polyethylene terephthalate, or a combination thereof, and said at least one radioactive layer is made of a radiative material selected from a natural radioactive source, an isotopic material undergoing β-radioactive decay, or a combination thereof.

7. The nuclear battery module as claimed in claim 6, wherein said radioactive material is selected from carbon-14, nickel-63, or a combination thereof.

8. A nuclear battery, comprising:

a shell defining a receiving space; and a nuclear battery module rolled up or bent so as to be disposed within said receiving space, said nuclear battery module including:

a radioactive unit including a soft substrate and at least one radioactive layer disposed on said soft substrate, said at least one radioactive layer including a β-ray source; and at least one energy conversion unit including a flexible carrier layer, an N-type semiconductor layer disposed on said flexible carrier layer, and a P-type semiconductor layer disposed on said N-type semiconductor layer opposite to said flexible carrier layer, said at least one energy conversion unit being disposed on said radioactive unit in a manner such that said flexible carrier layer is proximate to said radioactive unit.

9. The nuclear battery as claimed in claim 8, further comprising at least one wavelength conversion unit disposed between said radioactive unit and said at least one energy conversion unit, said at least one wavelength conversion unit including a soft layer and a wavelength conversion layer disposed on said soft layer, said wavelength conversion layer including a light-emitting material selected from scintillator, phosphor, or a combination thereof, and receiving β-ray emitted from said radioactive layer so as to produce excitation light having a wavelength different from that of the β-ray.

10. The nuclear battery as claimed in claim 8, wherein said radioactive unit includes two of said radioactive layers respectively disposed on two opposite surfaces of said soft substrate, and said nuclear battery module includes two of said energy conversion units, each of which is disposed on a corresponding one of said radioactive layers opposite to said soft substrate.

11. The nuclear battery as claimed in claim 8, wherein said nuclear battery module further includes at least one adhesive layer used to adhere said radioactive unit and said at least one energy conversion unit together.

12. The nuclear battery as claimed in claim 9, wherein said nuclear battery module further includes at least one adhesive layer used to adhere said radioactive unit, said at least one wavelength conversion unit, and said at least one energy conversion unit together.

13. The nuclear battery as claimed in claim 8, wherein said shell includes a surrounding wall portion extending in a lengthwise direction and two end portions respectively disposed at two opposite ends of said surrounding wall portion in the lengthwise direction, said receiving space being defined by said surrounding wall portion and said two end portions.

14. The nuclear battery as claimed in claim 13, wherein said shell further includes at least one electric connecting element disposed on at least one of said two end portions so as to permit said energy conversion unit to be electrically connected externally.

15. The nuclear battery as claimed in claim 13, further comprising a radiation shielding layer disposed on an inner surface of said surrounding wall portion.

16. The nuclear battery as claimed in claim 8, wherein said soft substrate is made of a material selected from graphene, polyethylene terephthalate, or a combination thereof, and said at least one radioactive layer is made of a radiative material selected from a natural radioactive source, an isotopic material undergoing β-radioactive decay, or a combination thereof.

17. The nuclear battery as claimed in claim 16, wherein said radioactive material is selected from carbon-14, nickel-63, or a combination thereof.

* * * * *